United States Patent
Hogan, II et al.

(10) Patent No.: US 12,185,714 B2
(45) Date of Patent: Jan. 7, 2025

(54) OPTIONAL LOCKABLE AQUATIC SNARE AND METHOD OF USE THEREOF

(71) Applicant: Lobster Smarter, LLC, Oakland, FL (US)

(72) Inventors: Vincent G. Hogan, II, Oakland Park, FL (US); James Mathie, Deerfield Beach, FL (US)

(73) Assignee: Lobster Smarter, LLC, Oakland Park, FL (US)

( * ) Notice: Subject to any disclaimer, the term of this patent is extended or adjusted under 35 U.S.C. 154(b) by 0 days.

(21) Appl. No.: 18/581,922

(22) Filed: Feb. 20, 2024

(65) Prior Publication Data
US 2024/0276973 A1    Aug. 22, 2024

Related U.S. Application Data

(60) Provisional application No. 63/447,074, filed on Feb. 21, 2023.

(51) Int. Cl.
*A01M 23/34*      (2006.01)
*A01K 74/00*      (2006.01)

(52) U.S. Cl.
CPC ............. *A01M 23/34* (2013.01); *A01K 74/00* (2013.01)

(58) Field of Classification Search
CPC ............................... A01M 23/34; A01K 74/00
See application file for complete search history.

(56) References Cited

U.S. PATENT DOCUMENTS

| | | | | |
|---|---|---|---|---|
| 643,673 A | * | 2/1900 | Morris | A01K 15/003 119/804 |
| 793,693 A | * | 7/1905 | Thompson | A01K 15/003 119/803 |
| 863,186 A | * | 8/1907 | Jester | A01K 15/003 119/804 |
| 1,343,213 A | * | 9/1920 | Johnson | A01K 15/003 119/804 |
| 1,478,999 A | * | 1/1924 | Johnson | A01K 15/003 119/804 |
| 1,850,255 A | * | 9/1932 | Amble | A01K 15/003 119/803 |
| 2,499,511 A | * | 3/1950 | Koger | A01K 15/003 119/803 |
| 2,522,454 A | * | 9/1950 | Lewry | A01K 97/14 119/804 |
| 2,704,052 A | * | 3/1955 | Wood | A01K 15/003 43/87 |

(Continued)

*Primary Examiner* — Jessica B Wong
(74) *Attorney, Agent, or Firm* — Greg M. Popowitz; Assouline & Berlowe, P.A

(57) ABSTRACT

The present invention broadly includes an aquatic snare, an outer rod having a distal end and a proximal end, an inner rod having a distal end and a proximal end, the inner rod slidable within the outer rod, a lasso connected to the proximal end of the inner rod, a knob connected to the distal end of the inner rod, the aquatic snare having a locking mechanism, comprising a depressor, selector, and a tension plate, the selector moveable to a locked or unlocked position, where the tension plate configured to restrict forward movement of the inner rod when the selector placed in the locked position, and the tension plate configured to allow unrestricted movement of the inner rod when the selector is placed the unlocked position.

6 Claims, 16 Drawing Sheets

(56) References Cited

U.S. PATENT DOCUMENTS

| | | | | |
|---|---|---|---|---|
| 3,540,769 | A * | 11/1970 | Rosser | A01M 23/34 |
| | | | | 294/119.2 |
| 3,949,514 | A * | 4/1976 | Ramsey | A01K 15/003 |
| | | | | 43/87 |
| 4,519,643 | A * | 5/1985 | Harris | B63B 21/54 |
| | | | | 114/221 R |
| 5,129,363 | A * | 7/1992 | Ricketts | A01K 27/004 |
| | | | | 119/799 |
| D450,801 | S | 11/2001 | Fundak | |
| 6,467,436 | B1 * | 10/2002 | Olausson | A01K 27/001 |
| | | | | 119/803 |
| 6,684,562 | B1 * | 2/2004 | Schade | A01K 15/003 |
| | | | | 43/87 |

* cited by examiner

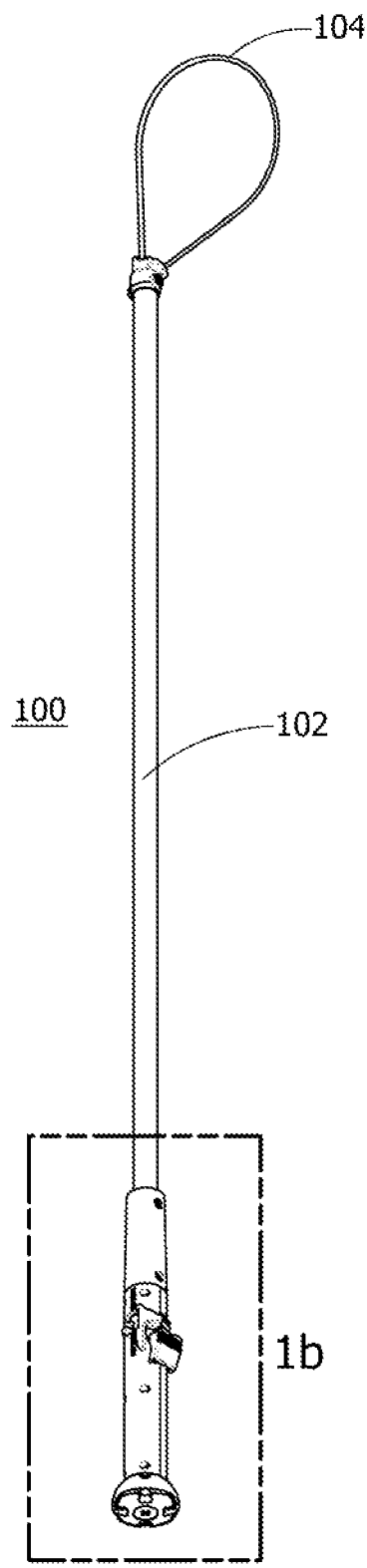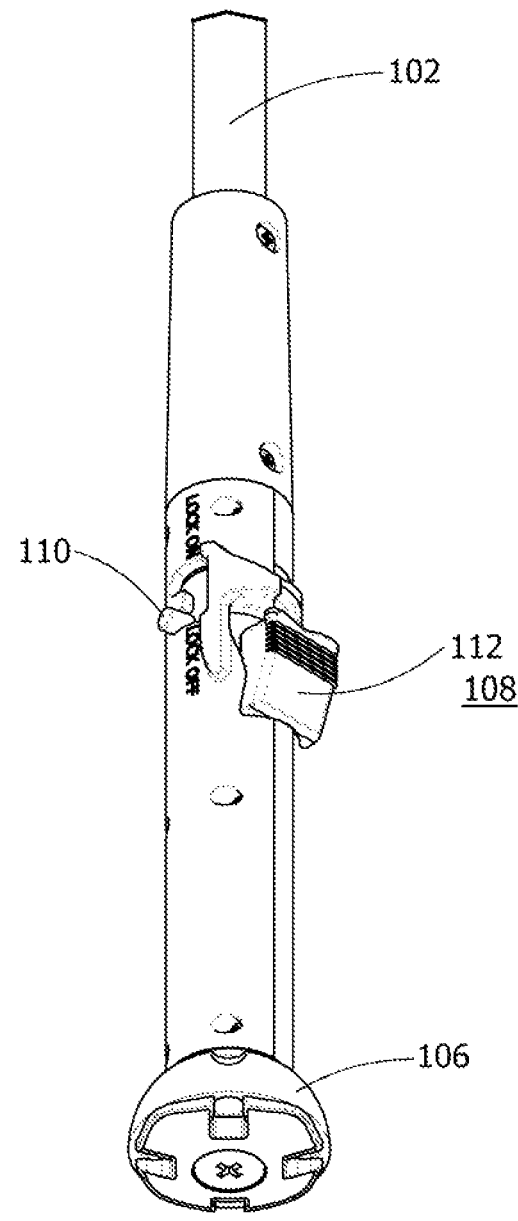
FIG. 1a
FIG. 1b

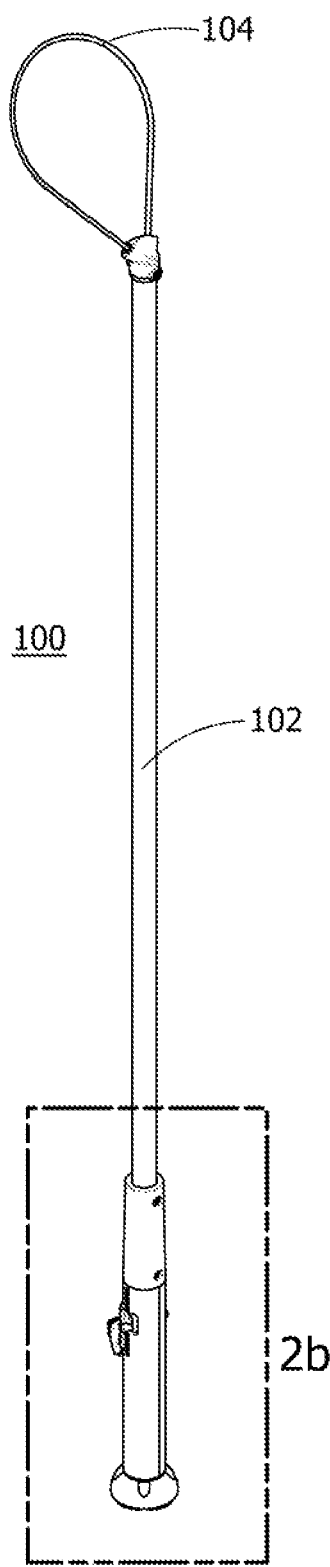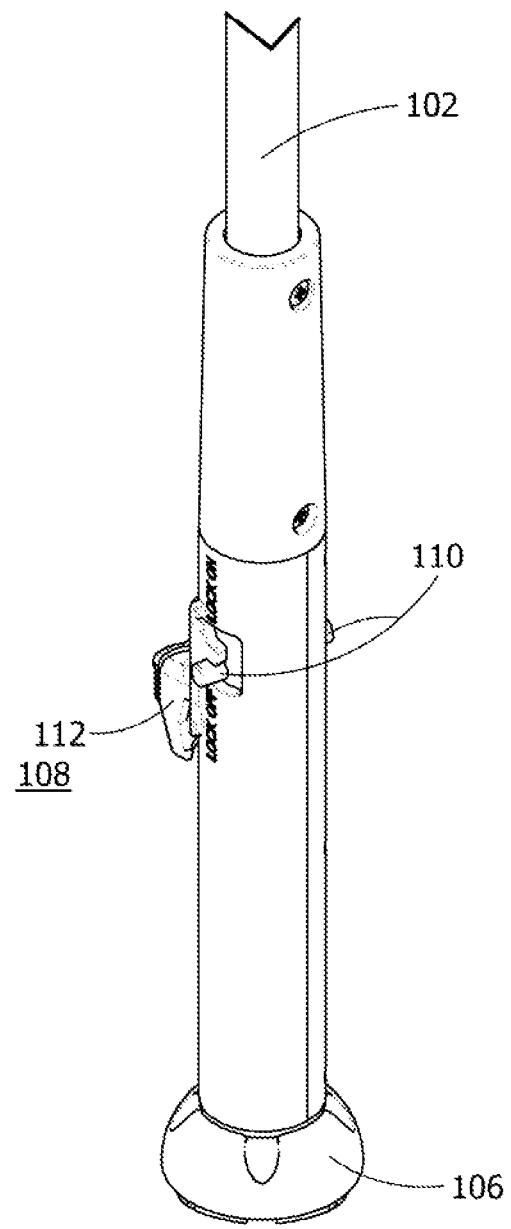
FIG. 2a                    FIG. 2b

OPTIONAL LOCKABLE AQUATIC SNARE AND METHOD OF USE THEREOF

REFERENCE TO RELATED APPLICATIONS

This patent application claims benefit under 35 U.S.C. § 119(e) of the U.S. Provisional Application No. 63/447,074, filed on Feb. 21, 2023, which is incorporated herein by reference.

BACKGROUND OF THE INVENTION

As can be derived from the variety of devices and methods directed at capturing freshwater and saltwater creatures, many means have been contemplated to accomplish the desired end, i.e., capturing lobsters and other shellfish with a snare. There is a long-felt need for a device and method of capturing aquatic creatures using a snare that locks in place upon capture for the benefit of the user, but allows the user the flexibility of setting the snare in an either unlocked or locked position at their discretion.

The main aquatic creature to which the invention is directed at capturing is a lobster. Most lobsters are found in holes, ledges, or crevices on reefs. A snare eliminates the need of a diver having to put his or her hand in the hole and either damaging the reef, damaging the lobsters, or potentially injuring themselves with the reef or other creatures dwelling in the hole, ledge, or crevice.

The use of this lobster snare prevents damaging the reef with the diver's hand and limits the damage to the lobsters. The use of a metal shaft instead of flexible plastic allows the user to use snare like a "tickle stick" to tap the lobsters out of their locations within the reef. Using monofilament as the loop instead of metal cable also limits the damage to the lobsters. Other materials besides monofilament can be used that is flexible to snare the lobsters without damaging the lobsters, unlike the currently standard of a metal cable.

Expired ornamental design U.S. Pat. No. D450,801 S for a retractable lobster snare, commonly referred to as the "green snare," has a flexible plastic shaft and metal cable loop. There are many other lobster snares on the market today including an automatic metal cable loop closure, a solid metal shaft (no fiberglass rod) with a flexible loop at the end, and even a retractable, spring-loaded metal shaft and cable loop. The green snare permits the retraction of the metal cable loop until the full travel of the cable is reached. However, the user cannot return the cable without pressing and holding the tension button in a disengaged position. The ability to release the tension on the metal loop and lock the snare in an open position to allow the free movement of the flexible loop back and forth is lacking in the current marketplace.

The use of the present invention will allow the user the option of using a locking or bypass the locking mechanism. This optional feature is presently not available on any lobster snare in the marketplace. An additional feature is the ergonomic thumb release for the tension lever, which allows for better dexterity for the user with a gloved or non-gloved hand.

BRIEF STATEMENT OF THE INVENTION

The invention broadly relates to snares, nooses, fishing, and capture devices for aquatic creatures and methods of use thereof.

SUMMARY OF THE INVENTION

An aquatic snare including an outer rod having a proximal end and distal end, an inner rod having a distal end and a proximal end, the inner rod housed within the outer rod, the inner rod slidable within the outer rod, a lasso connected to the proximal end of the inner rod, a knob connected to the distal end of the inner rod, the outer rod having a locking mechanism at the distal end, the locking mechanism having a depressor, selector, and a tension plate, the selector moveable to a locked or unlocked position, where the tension plate configured to restrict forward movement of the inner rod when the selector placed in the locked position, and the tension plate configured to allow unrestricted movement of the inner rod when the selector is placed the unlocked position.

An aquatic snare including an inner rod and outer rod, where the inner rod is slidable within the outer rod, a lasso with at least one end secured to a proximal end of the inner rod, where the lasso travels through a tip at a proximal end of the outer rod, a handle on the distal end of the outer rod, where the user moves a selector to a locked or unlocked position in a selector groove, a tension plate is connected to the selector, the tension plate restricts forward movement of the inner rod when the selector is placed in the locked position in the selector groove, and the tension plate allows unrestricted movement of the inner rod when the selector is placed the unlocked position in the selector groove.

A method of using an aquatic snare, including positioning a locking mechanism to a locked position, placing a lasso located at the proximal end of an outer rod over an aquatic creature, pulling a knob at the distal end of the outer rod, where the knob is connected to the distal end of an inner rod, the inner rod is located within the outer rod, and the lasso is connected to a proximal end of the inner rod, tightening the lasso around the aquatic creature by pulling the knob away from the distal end of the outer rod, and restricting the inner rod relative to the outer rod to prevent the lasso from expanding.

OBJECT OF THE INVENTION

It is a general object of the present invention to provide a lockable, and unlockable, aquatic snare for use on multiple species of aquatic creatures and methods of use thereof.

These and other objects and advantages of the present invention will be readily appreciable from the following description of preferred embodiments of the invention and from the accompanying drawings and claims.

BRIEF DESCRIPTION OF FIGURES

The nature and mode of operation of the present invention will now be more fully described in the following detailed description of the invention taken with the accompanying drawing figures, in which:

FIG. 1a is a front perspective view of the aquatic snare.

FIG. 1b is a zoomed in section of the handle area of FIG. 1a.

FIG. 2a is a rear perspective view of the aquatic snare.

FIG. 2b is a zoomed in section of the handle area of FIG. 2a.

DETAILED DESCRIPTION

Figure 3:
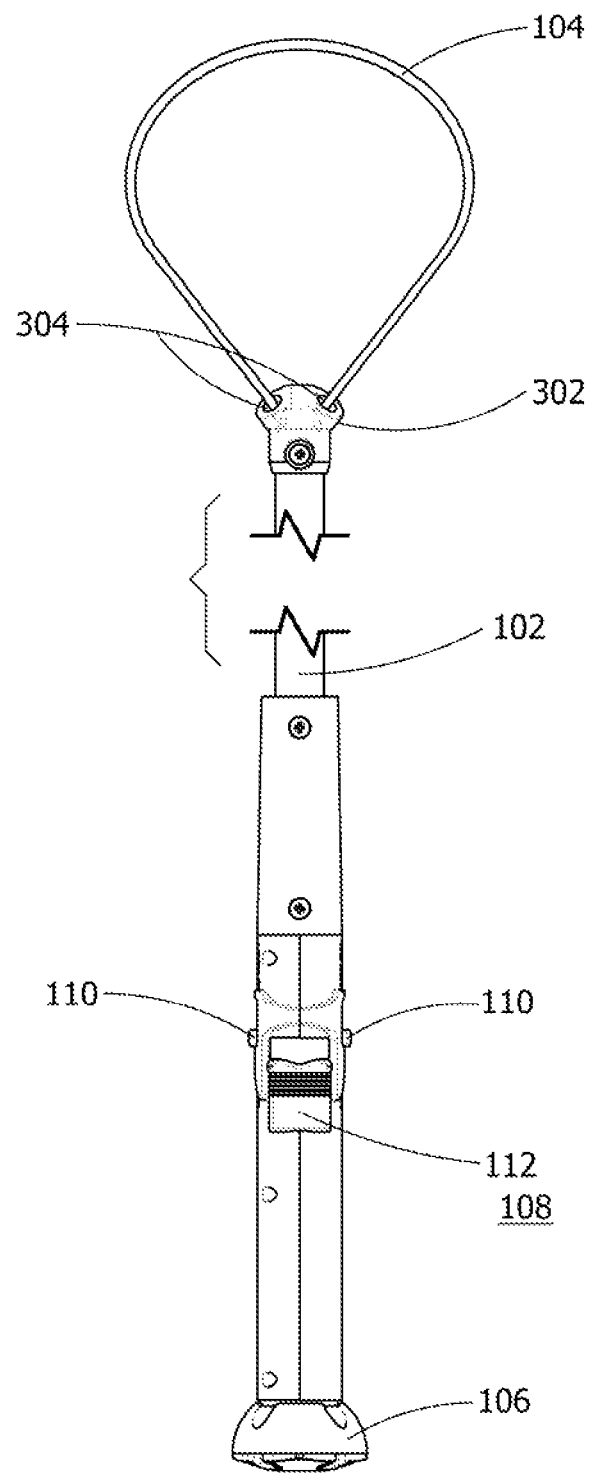
FIG. 3 is a top view of the aquatic snare.
Figure 4:
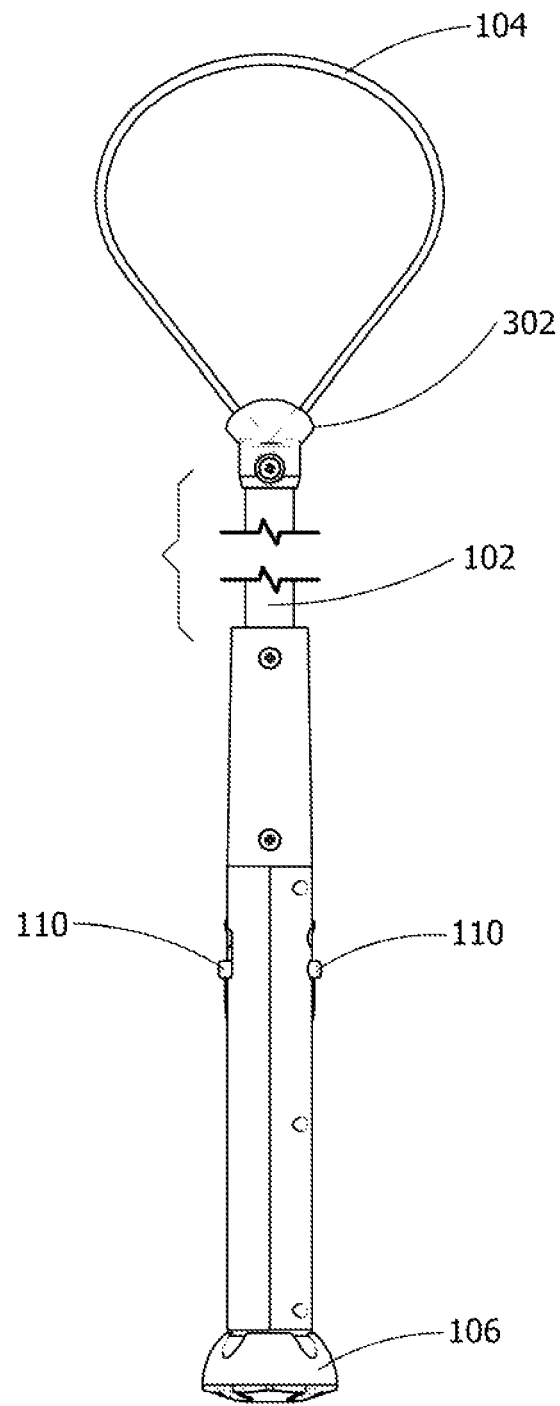
FIG. 4 is a bottom view of the aquatic snare.

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Unless defined otherwise, all technical and scientific terms used herein have the same meaning as commonly understood to one of ordinary skill in the art to which this invention belongs. It should be appreciated that the term "snare" is synonymous with terms such as "stick", "pole", "bar", etc., and such terms may be used interchangeably as appearing in the specification and claims. Although any methods, devices or materials similar or equivalent to those described herein can be used in the practice or testing of the invention, the preferred methods, devices, and materials are now described.

The purpose of the invention is to snare aquatic creatures using a loop and provide the user the ability to hold the aquatic animal in place without additional force until the user is ready to release the aquatic animal. The present invention allows the user to retract a rod making the loop fit tightly around a lobster or other aquatic animal. The loop element is made of plurality of materials, including but not limited to: monofilament, nylon, metal, and other pliable materials. The present invention also serves as a "tickle stick," which allows the user to gentle tap the lobster out of the reef or enclosure. Once "tickled," the lobster is easier to catch using the instant invention.

Adverting now to the figures, FIGS. 1a and 1b shows an aquatic snare 100. Aquatic snare 100 includes an outer rod 102 with a proximal end and a distal end. Outer rod 102 is optionally made from marine grade anodized aluminum in a bright orange color, which helps the user see aquatic snare 100 under water. The distal end of outer rod 102 is shown in the zoomed in section of FIG. 1b. Knob 106 is also located near the distal end of the aquatic snare 100. Locking mechanism 108 is shown at the bottom (distal end) of the aquatic snare 100. Part of the locking mechanism 108 is selector 110. There are two selectors 110 that protrude from selector body 816, shown in FIGS. 8-10. The proximal end of outer rod 102 is shown at the top of the aquatic snare 100. The top of aquatic snare 100 also include lasso 104. FIGS. 2a and 2b show a different vantage point from FIGS. 1a and 1b.

FIGS. 3-6 show lasso 104 travelling through the lasso holes 304 of tip 302. As shown, there is a single lasso 104 passing through two lasso holes 304 of tip 302. In an exemplary embodiment, the aquatic snare 100 has one lasso hole 304 or a plurality of lasso holes 304. Lasso 104 is fed through tip 302 at the proximal end of outer rod 102. The ends of lasso 104 are secured to inner rod 702 directly or through an adapter. The ends of lasso 104 are crimped into place to secure lasso 104 to inner rod 702, or an adapter between inner rod 702 and the ends of lasso 104.

Figure 5:
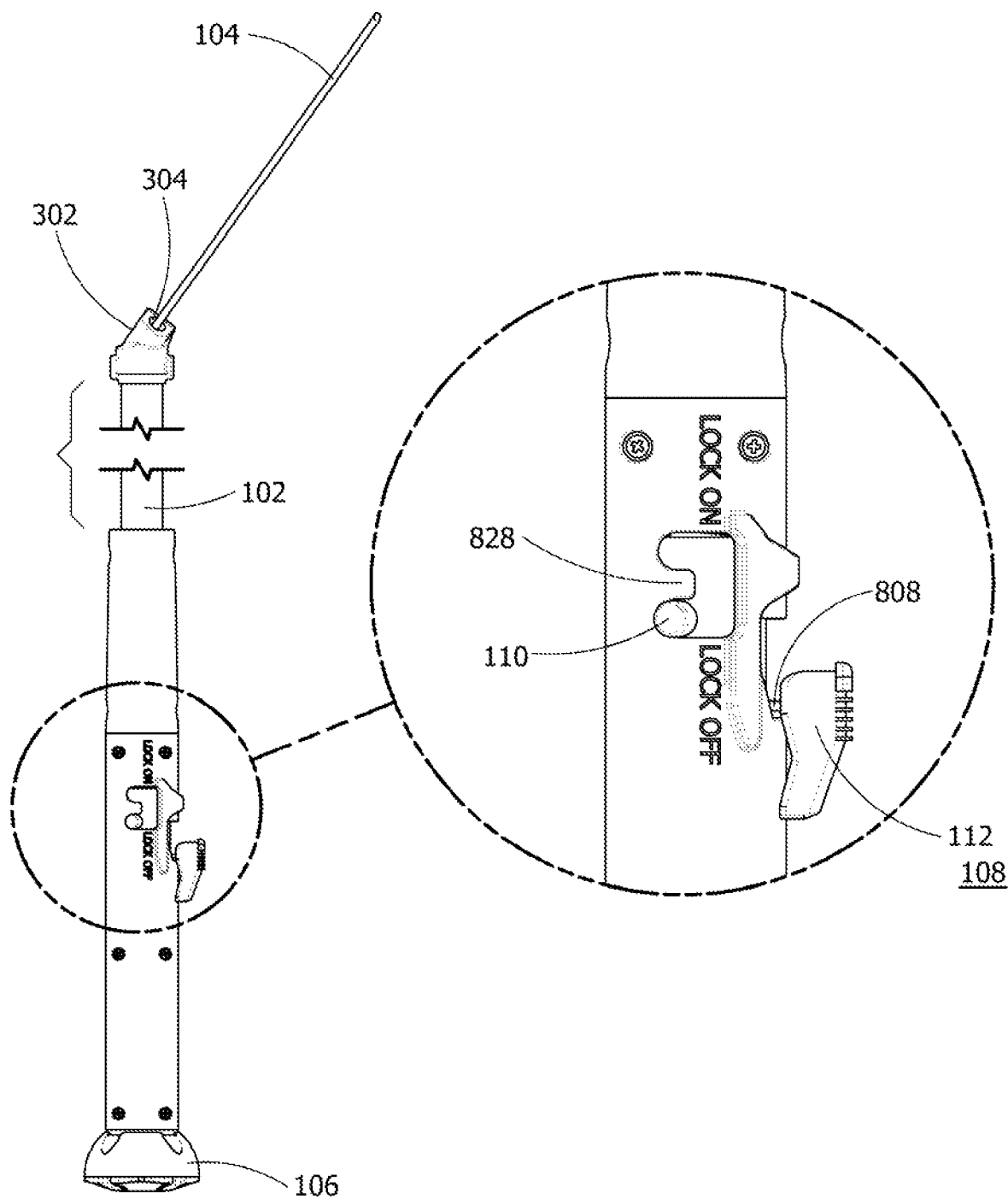
FIG. 5 is a left side view of the aquatic snare.
Figure 6:
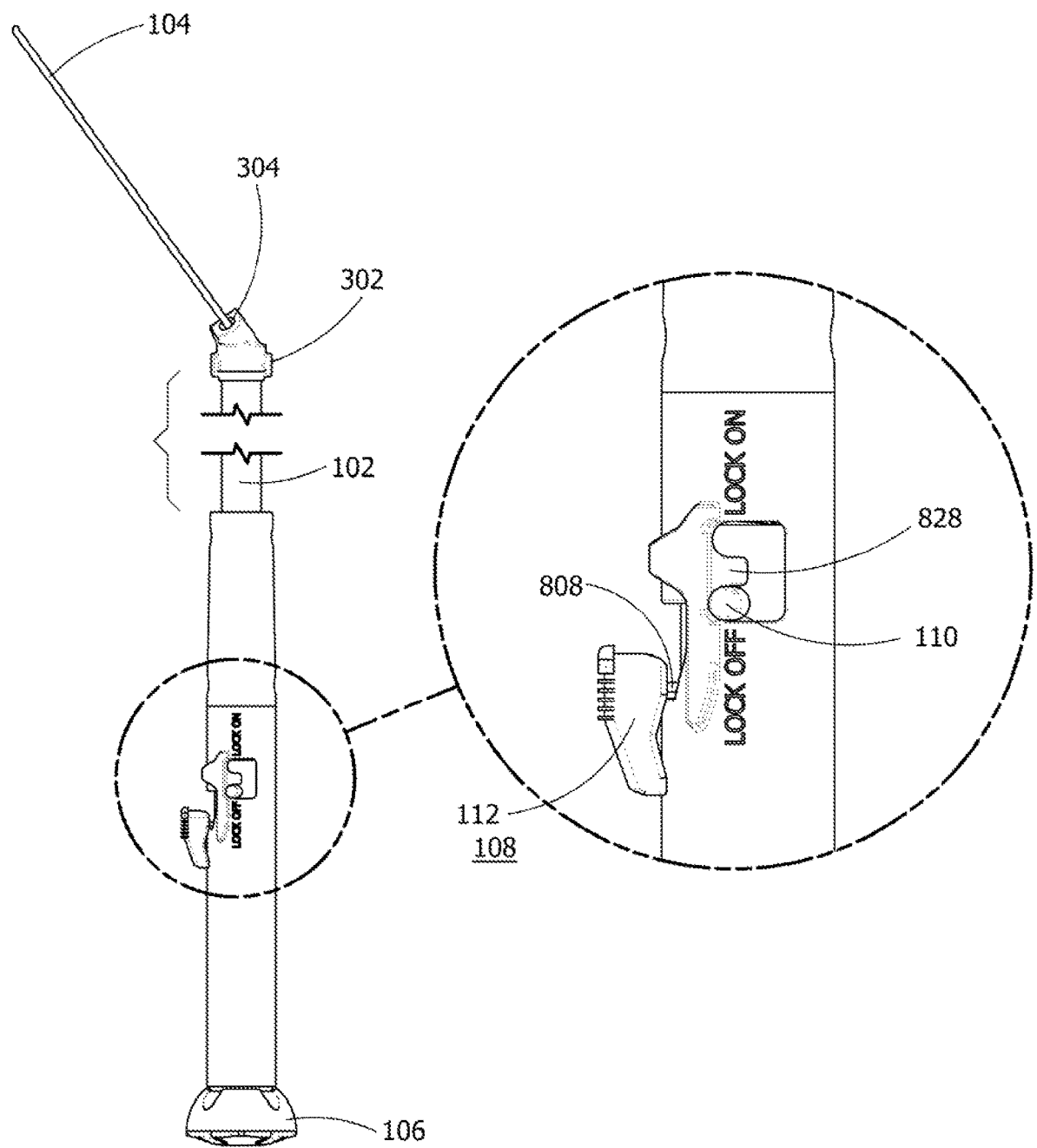
FIG. 6 is a right side view of the aquatic snare.

In an exemplary embodiment, as shown in FIGS. 5 and 6, tip 302 is angled relative to the longitudinal axis of outer rod 102. The angle if tip 302 changes the outward angle of lasso 104. In yet another exemplary embodiment, the position of lasso holes 304 on tip 302 vary to change the outward position and angle of lasso 104. The position of lasso 104 and the angle of tip 302 varies based on the preferences of the user in catching lobsters and other aquatic animals. For example, some users prefer to catch a lobster using a side catch method, while other users prefer to use an above catch method.

The material of lasso 104 varies based on the intent use of aquatic snare 100. The most common materials are marine grade stainless steel and monofilament. This allows lasso 104 to be flexible as it is retracted around lobster 706 and into outer rod 102. Side catch users may prefer stainless steel lassos while above catch users may prefer monofilament.

Figure 7A:
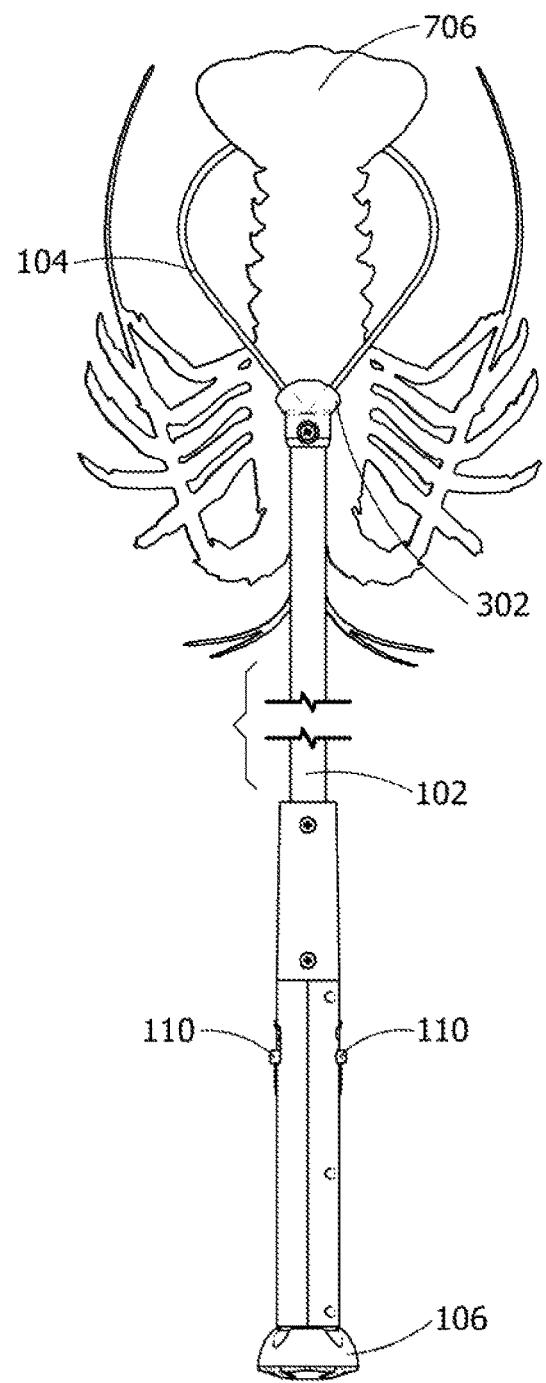
FIG. 7a is a bottom view of the aquatic snare with the lasso loosely around a lobster.

FIG. 7a shows the aquatic snare 100 and the lasso 104 positioned around a lobster 706. While a spiny lobster is shown, any crustation or animal could be caught using the aquatic snare 100.

Figure 7B:
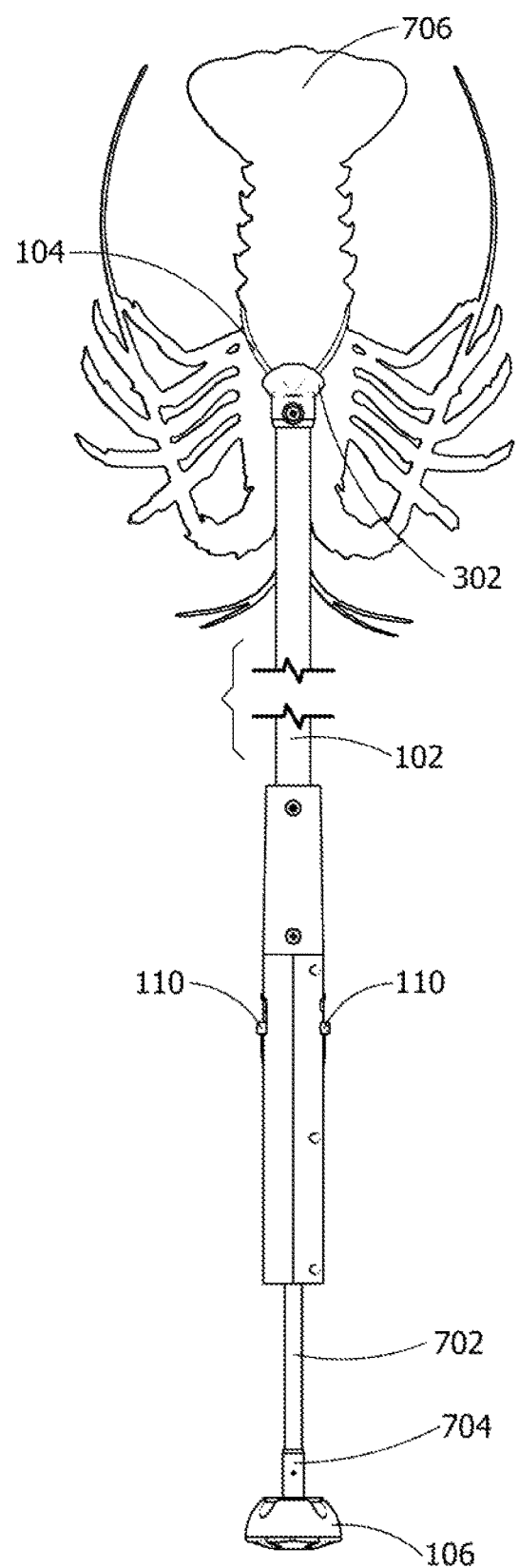
FIG. 7b is a bottom view of the aquatic snare with the knob retracted and the lasso tightened around the lobster.

FIG. 7a shows the knob 106 in a forward position next to the handle 802. To catch lobster 706, the user pulls back on knob 106 as shown in FIG. 7b. Knob 106 is connected to the distal end of inner rod 702 directly or using inner rod coupling 704. Knob 106 is independently rotatable relative to inner rod 702. Inner rod 702 slides within outer rod 102. The ends of lasso 104 are connected to the proximal end of inner rod 702. In an exemplary embodiment, the lasso 104 is crimped onto the inner rod 702 or an adapter connected to the inner rod 702.

When the user pulls back on knob 106, away from handle 804, the lasso 104 retracts inside the outer rod 102 and tightens around lobster 706. The objective of the aquatic snare 100 is to secure the lobster 706 within lasso 104 until the user is ready to grab lobster 706 with their hand or otherwise deposit lobster 706 for storage.

Figure 8:
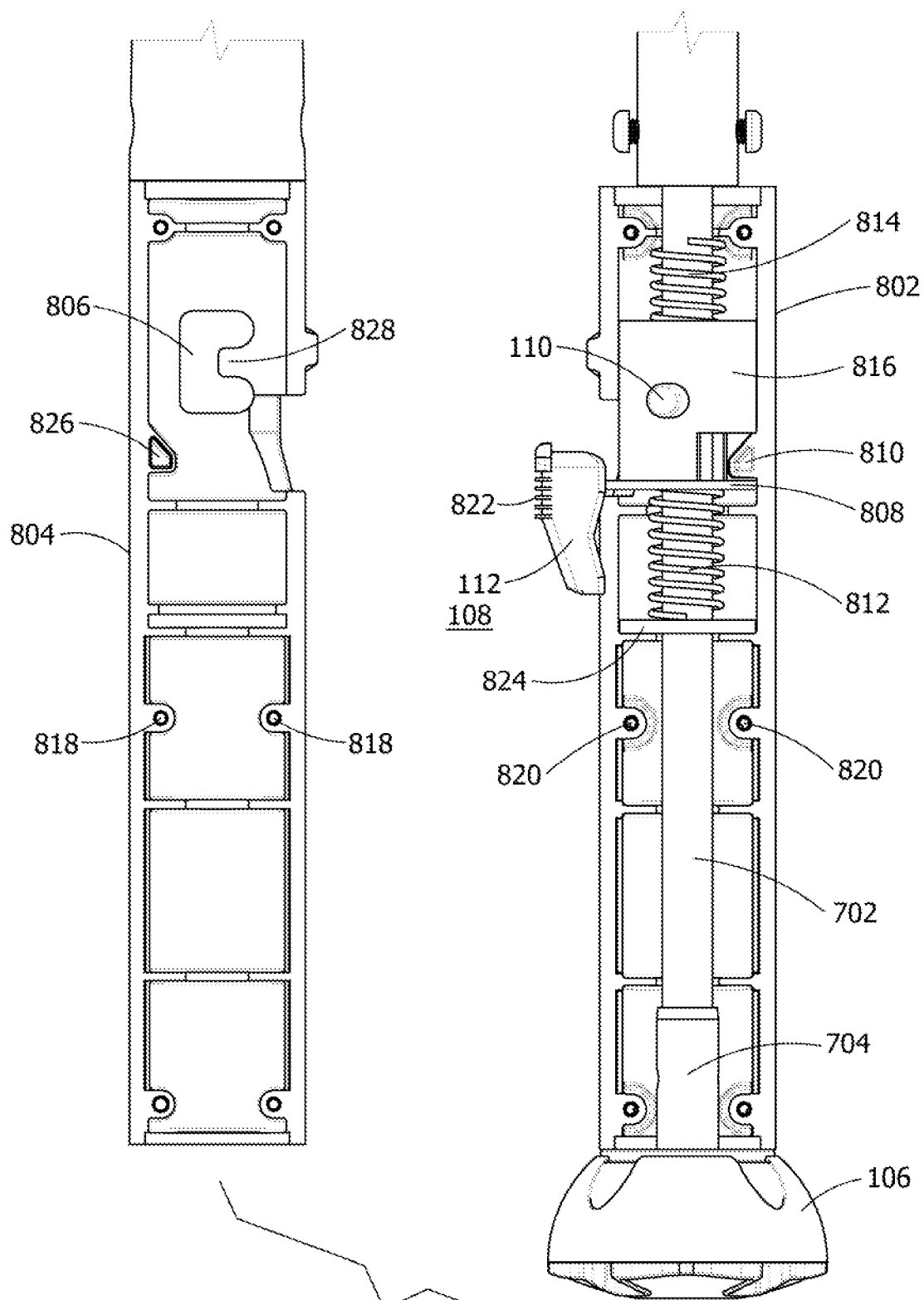
FIG. 8 is side view of the open handle and the removable cover of the aquatic snare.

FIG. 8 shows a close-up view of the handle 804. Aquatic snare 100 includes removable cover 802 to handle 804. Removable cover 802 allows the user to gain access to the internal mechanism of the handle 804 to repair and maintain the internal components if needed at a later time. If a part wears or becomes broken over time or usage, removable cover 802 allows the user to disassemble aquatic snare 100 to replace or fix the needed components. Removable cover 802 is secured to handle 804 using removable cover screw holes 818, handle screw holes 820, and fasteners 902. In an exemplary embodiment, the outside of handle 804, including removable cover 802, includes a diamond plate pattern to help the user grip aquatic snare 100 with their hands or gloves.

Handle 804 contains locking mechanism 108. Locking mechanism 108 includes depressor 112, selector 110, selector body 816, and tension plate 808. Tension plate 808 is secured to depressor 112. Tension plate 808 interacts with selector body 816 and inner rod 702. Handle 804 is secured to outer rod 102. Inner rod 702 slides within outer rod 102 and handle 802.

Figure 9:
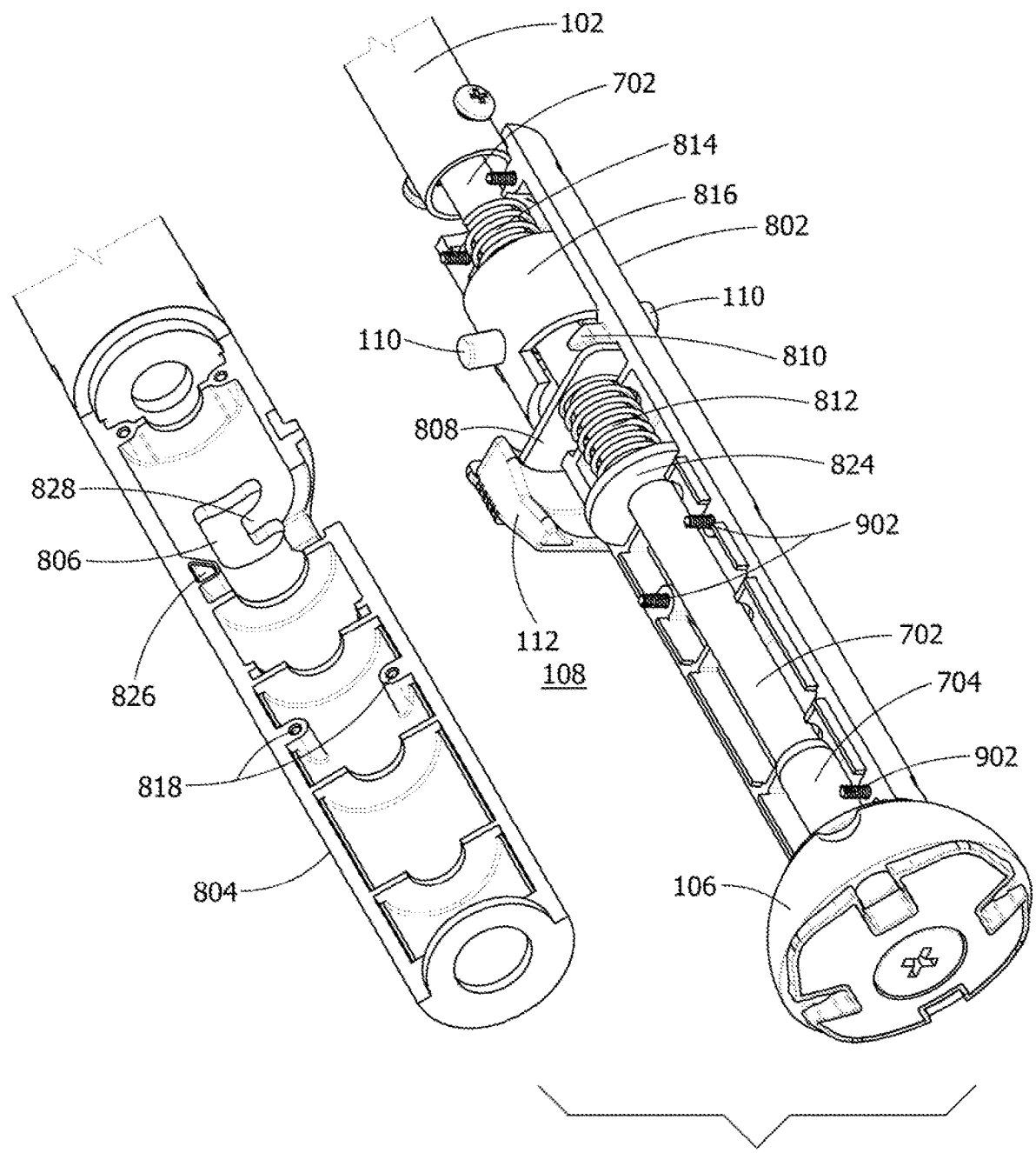
FIG. 9 is a front perspective view of the open handle and the removable cover of the aquatic snare.
Figure 10:
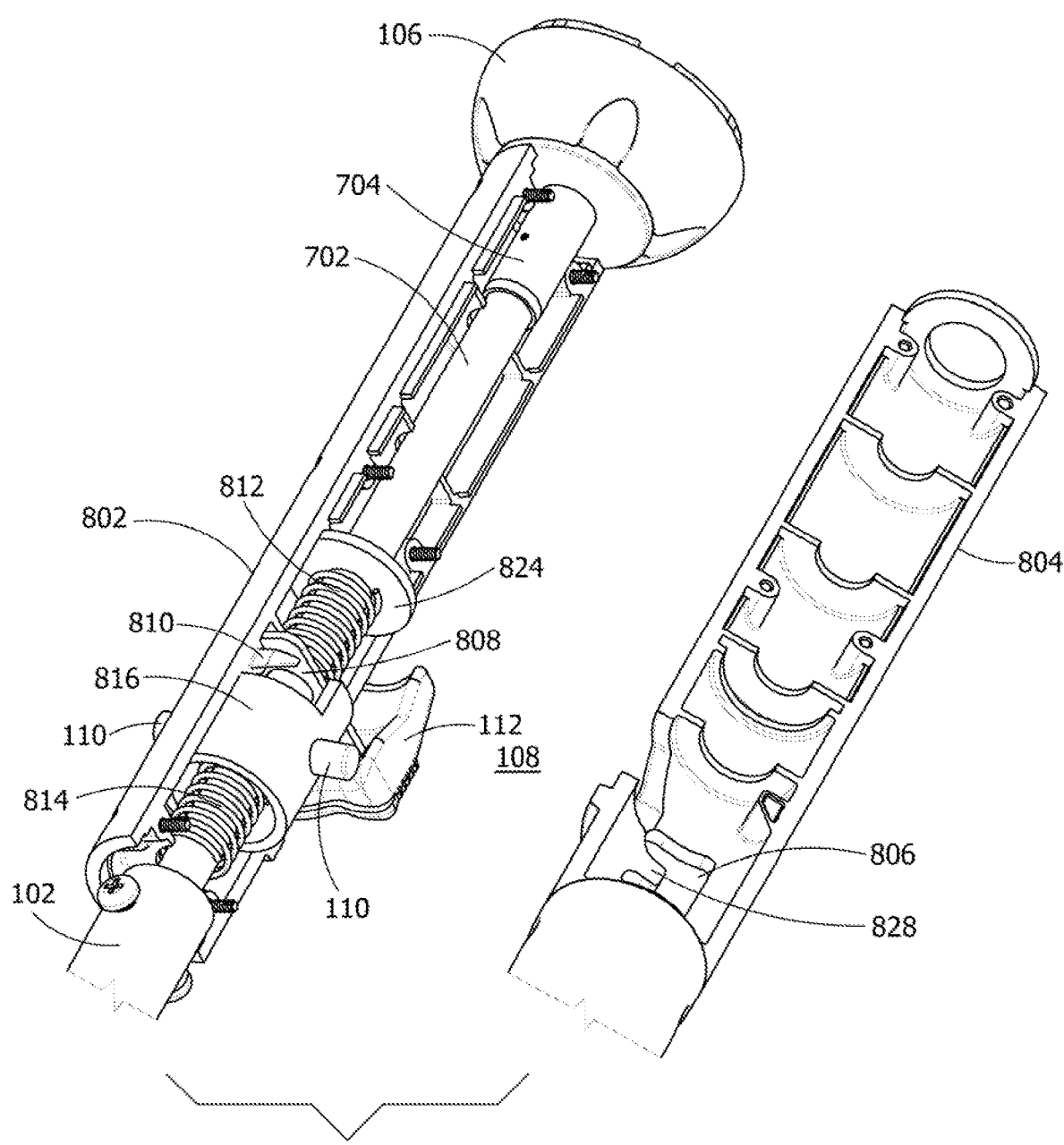
FIG. 10 is a perspective view of the open handle and the removable cover of the aquatic snare.

As shown in removable cover 802 of FIGS. 8-10, one selector groove 806 is an opening within removable cover 802. A complementary selector grove 806 is located on handle 804, as shown in FIGS. 1b and 2b. Selector 110 is located within selector groove 806. The user can move selector 110 into one of two positions within selector groove 806, either a "lock off" or "lock on" position. As shown in FIGS. 5 and 6, the "lock off" position within the selector groove 806 is located toward the distal end of the handle 804. The "lock on" position within the selector groove 806 is located toward the proximal end of the handle 804. The "lock on" and "lock off" positions of selector groove 806 are separated by selector ridge 828. In an exemplary embodiment, the "lock on" and "lock off" positions are reversed.

Figure 11A:
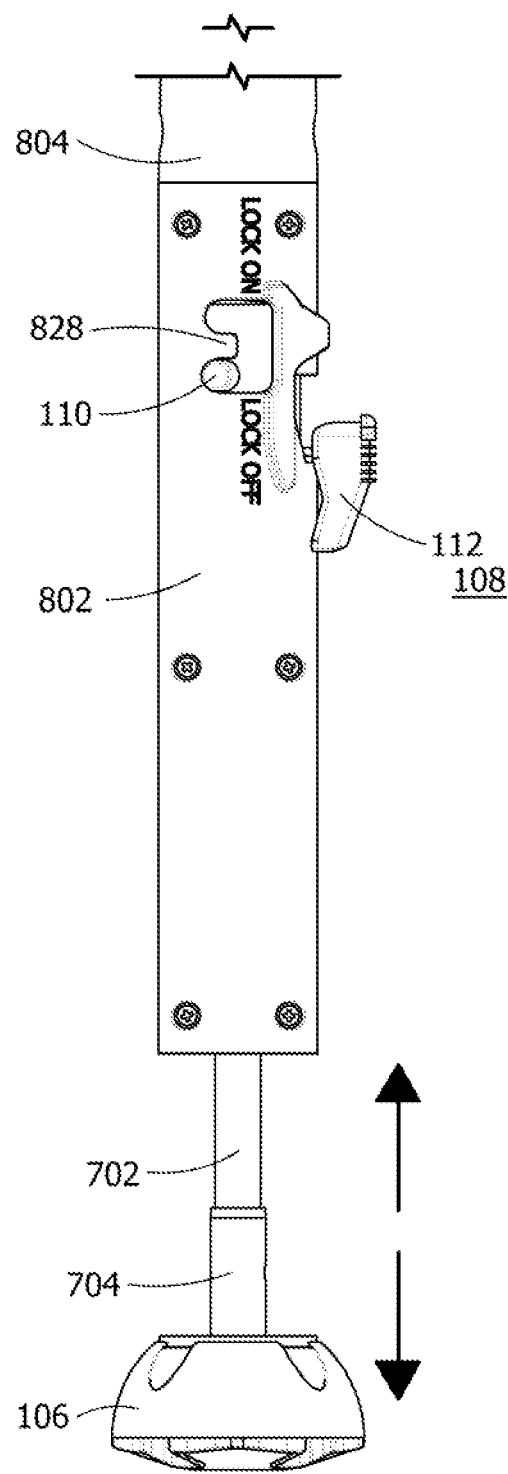
FIG. 11a is a right side view of the assembled handle (removable cover installed) of the aquatic snare in a "lock off" position, showing unrestricted movement of the inner rod.
Figure 11B:
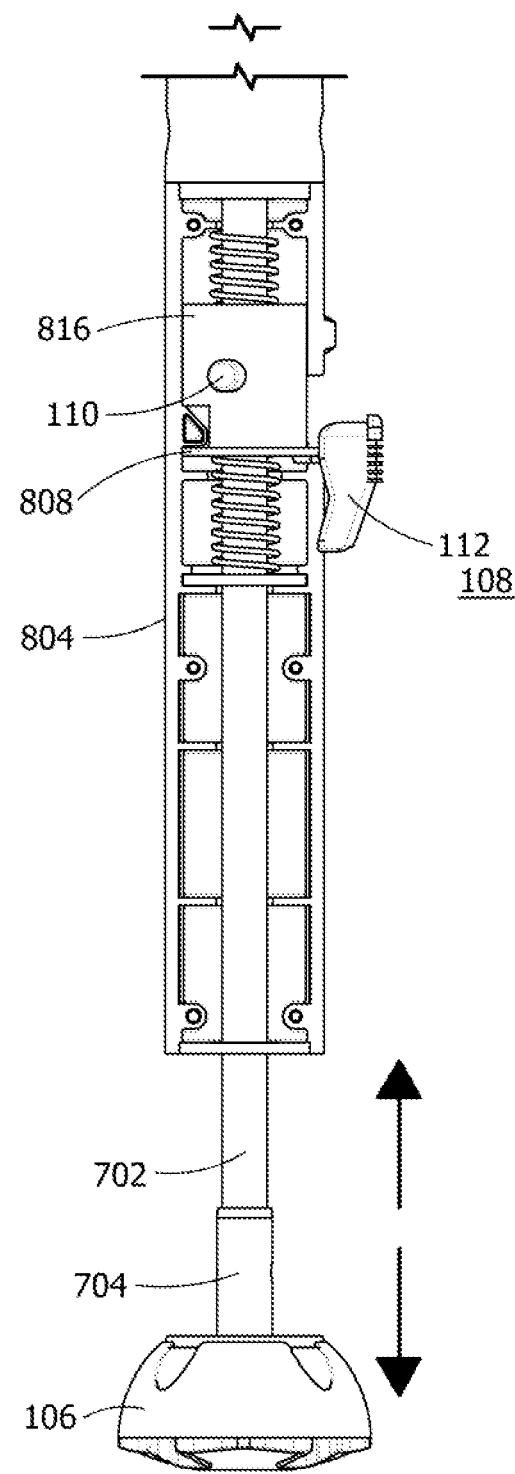
FIG. 11b is a right side view of the unassembled handle (removable cover removed) of the aquatic snare in a "lock off" position, showing unrestricted movement of the inner rod.

In a "lock off" position, as shown in FIGS. 11a, 11b, 12a, and 12b, selector 110 is at the distal position in selector groove 806. This position allows for unrestricted movement of inner rod 702 relative to outer rod 102. The user can pull knob 106 forward and back to loosen and tighten lasso 104. The inverted profile of selector groove 806 is illustrated in a comparison of FIG. 11a to FIG. 12a. In FIG. 11a, selector ridge 828 is at the bottom of the selector groove 806 while in FIG. 12a, selector ridge 828 is at the top of the selector groove 806.

In a "lock on" position, as shown in FIGS. 13a, 13b, 14a, and 14b, selector 110 is at the distal position in selector groove 806. In a "lock on" position, the user can retract knob 106 (and connected inner rod 702) but cannot move knob 106 (and connected inner rod 702) forward due to the fictional contact of inner rod 702 with tension plate 808. Depending on the positioning of tension plate 808 in the "lock on" position, tension plate 808 may contact selector body 816.

FIGS. 15a, 15b, 16a, and 16b show the aquatic snare 100 in a "lock on" position with the depressor 112 engaged (pressed). This removes the frictional contact between tension plate 808 and inner rod 702, allowing unrestricted movement of inner rod 702 relative to outer rod 102. By the user manually pressing depressor 112 in a "lock on" position, the inner rod 702 has unrestricted movement relative to outer rod 102, similar to a "lock off" position.

To switch the selector 110 from "lock off" to "lock on", the user rotates selector body 816 to the proximal position in selector groove 806. Selector body 816 rotates relative to the same longitudinal axis as the centerline of the inner rod 702 and outer rod 102. The user is able to rotate selector 110 to "lock on" or "lock off" positions using the same hand that is holding handle 804. Also, selector 110 and selector groove 806 (albeit inverted) being on both sides of handle 804 allows for ambidextrous usage of the aquatic snare 100.

Due to the rotational movement of selector body, and selector 110 within selector groove 806, selector groove 806 on one side of handle 804 is inverted relative to selector groove 806 on the other side of handle 804 (i.e., removable cover 802). The inverted nature of selector groove 806 is shown in FIGS. 1b, 2b, 5, and 6.

Tension plate 808 moves relative to the selector 110 position within selector groove 806. Tension plate 808 is constrained within handle 804 partially due to tab 810. Tab 810, shown in FIGS. 8-10, protrudes outward and fits into tab opening 826 of removable cover 802 when removable cover 802 is secured to handle 804. Tab 810 restricts the travel of tension plate 808 when selector 110 is moved to a "lock on" or "lock off" position.

Locking mechanism 108 includes depressor 112, selector 110, and tension plate 808. Depressor 112 includes depressor ribs 822 to help with the user's grip when engaging of disengaging depressor 112. Depressor ribs 822 provide contours for the user's fingers on depressor 112. In an exemplary embodiment, the position of depressor 112 on handle 804, relative to the outer rod 102 and tip 302, is varied based on the preference of the user. For example, some users prefer to use their thumb to press depressor 112 (the front of handle 804). While some users prefer to use a different finger and want depressor 112 oriented on the back of handle 804.

When selector 110 is positioned in the "lock on" position in selector groove 806, tension plate 808 restricts the forward movement of inner rod 702. Even in the "lock on" position, the user is able to pull knob 106 back, with inner rod 702, to cause lasso 104 to tighten (i.e., become smaller) as lasso 104 is pulled back and into outer rod 102. See FIGS. 12a and 12b, which show aquatic snare 100 in the "lock on" position and the restricted forward movement of inner rod 702.

Figure 12A:
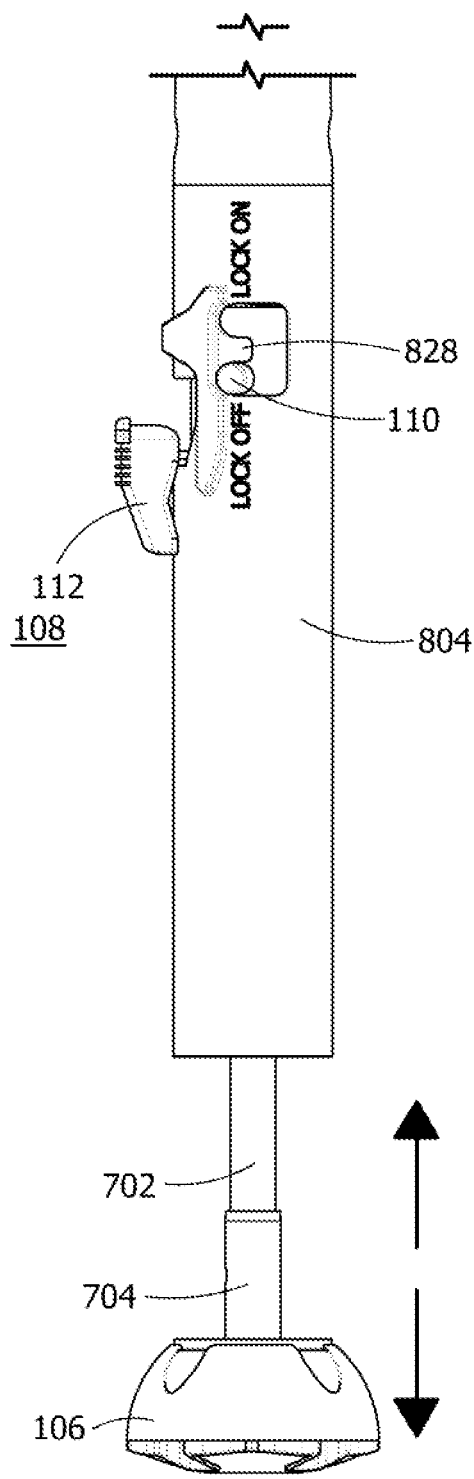
FIG. 12a is a left side view of the assembled handle (removable cover installed) of the aquatic snare in a "lock off" position, showing unrestricted movement of the inner rod.
Figure 12B:
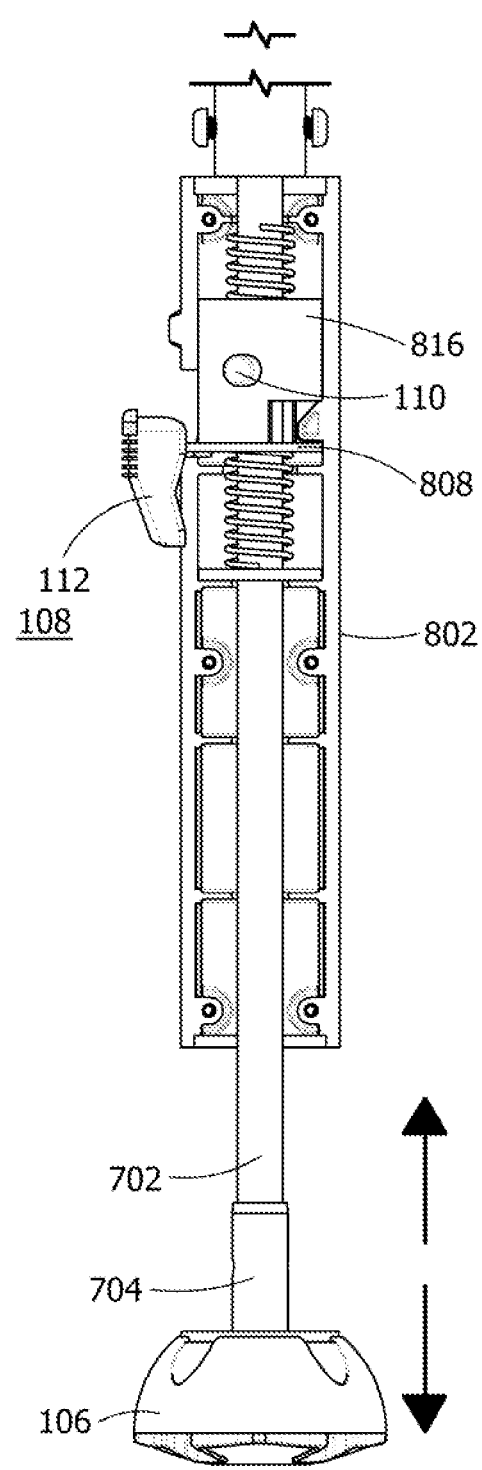
FIG. 12b is a left side internal view of the handle (removable cover installed, handle invisible) of the aquatic snare in a "lock off" position, showing unrestricted movement of the inner rod.
Figure 13A:
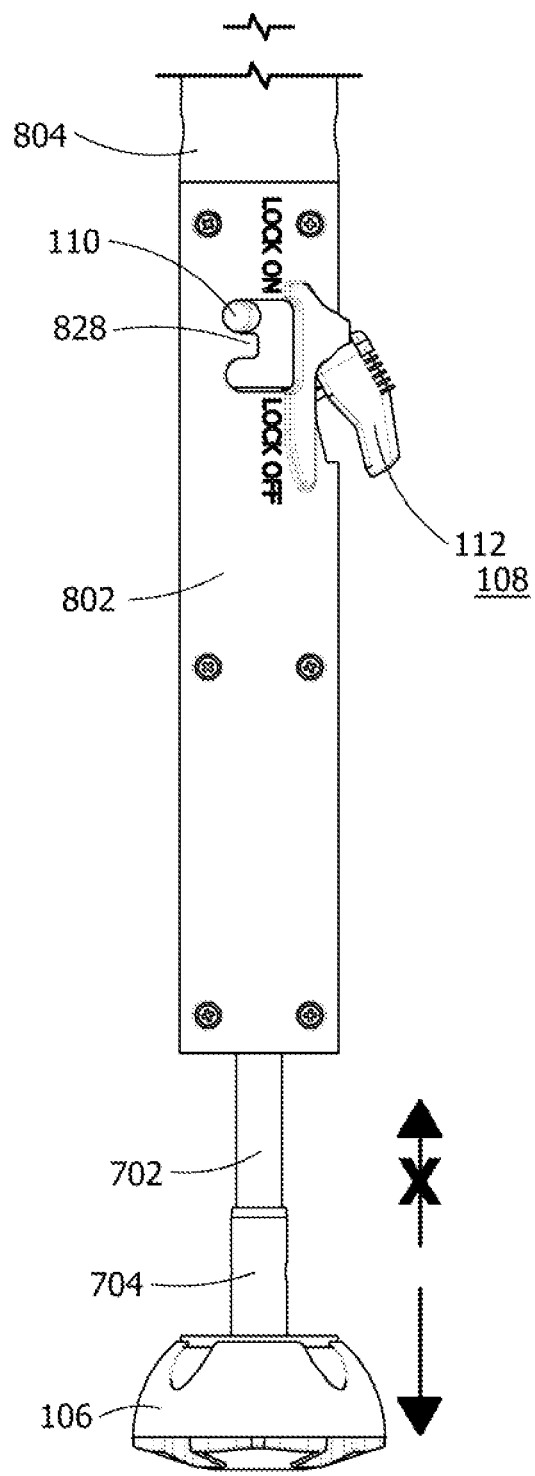
FIG. 13a is a right side view of the assembled handle (removable cover installed) of the aquatic snare in a "lock on" position, showing restricted forward movement of the inner rod.
Figure 13B:
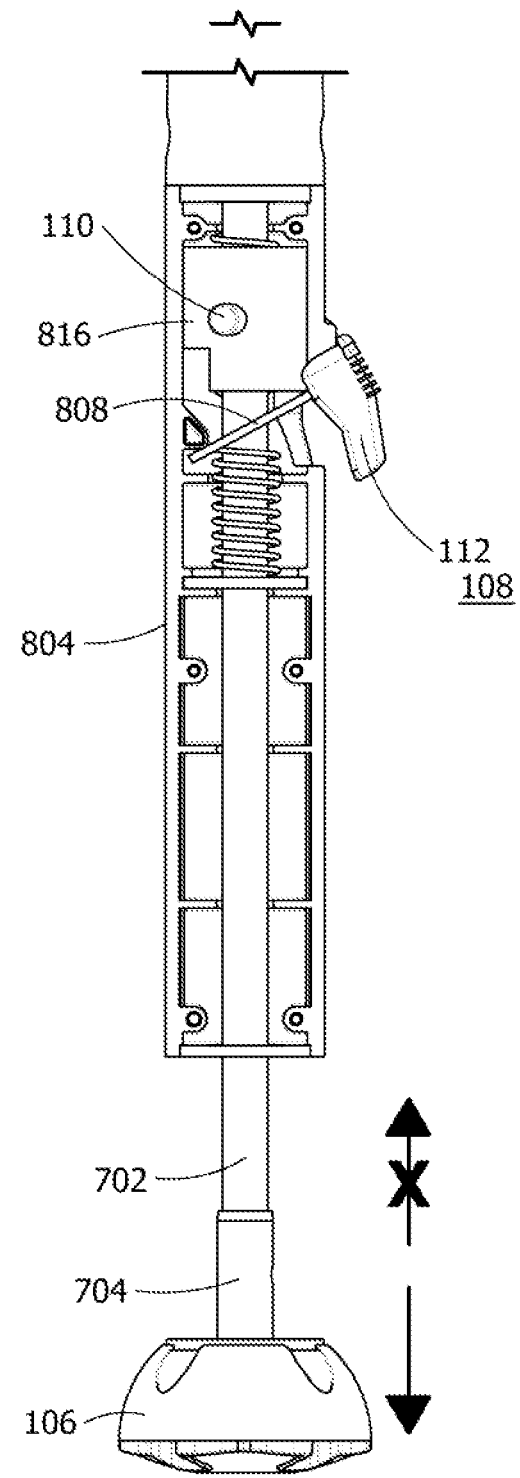
FIG. 13b is a right side view of the unassembled handle (removable cover removed) of the aquatic snare in a "lock on" position, showing restricted forward movement of the inner rod.
Figure 14A:
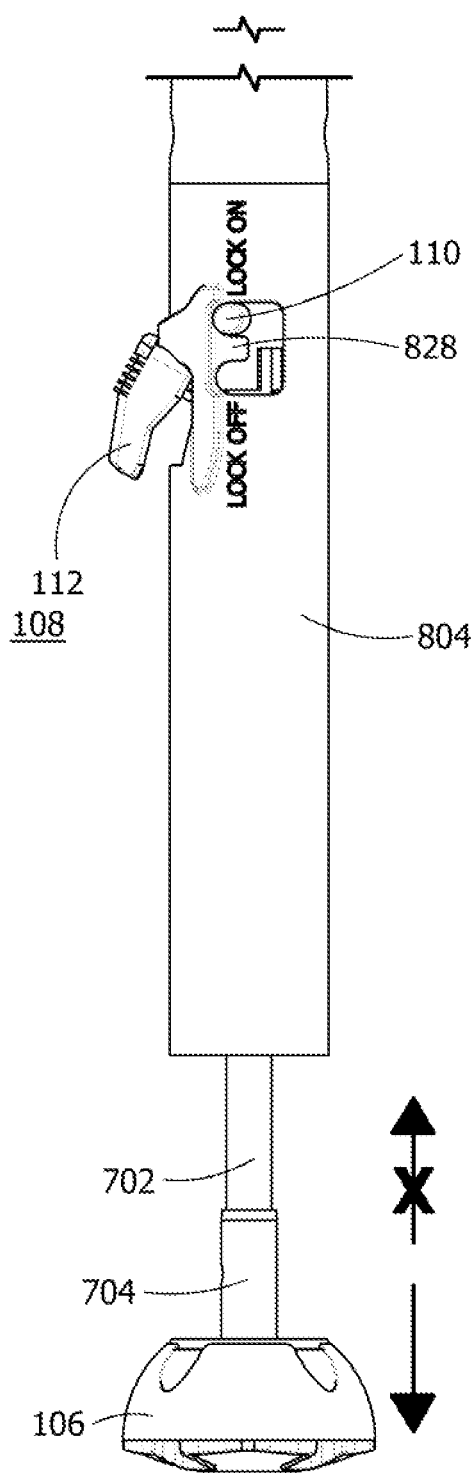
FIG. 14a is a left side view of the assembled handle (removable cover installed) of the aquatic snare in a "lock on" position, showing restricted forward movement of the inner rod.
Figure 14B:
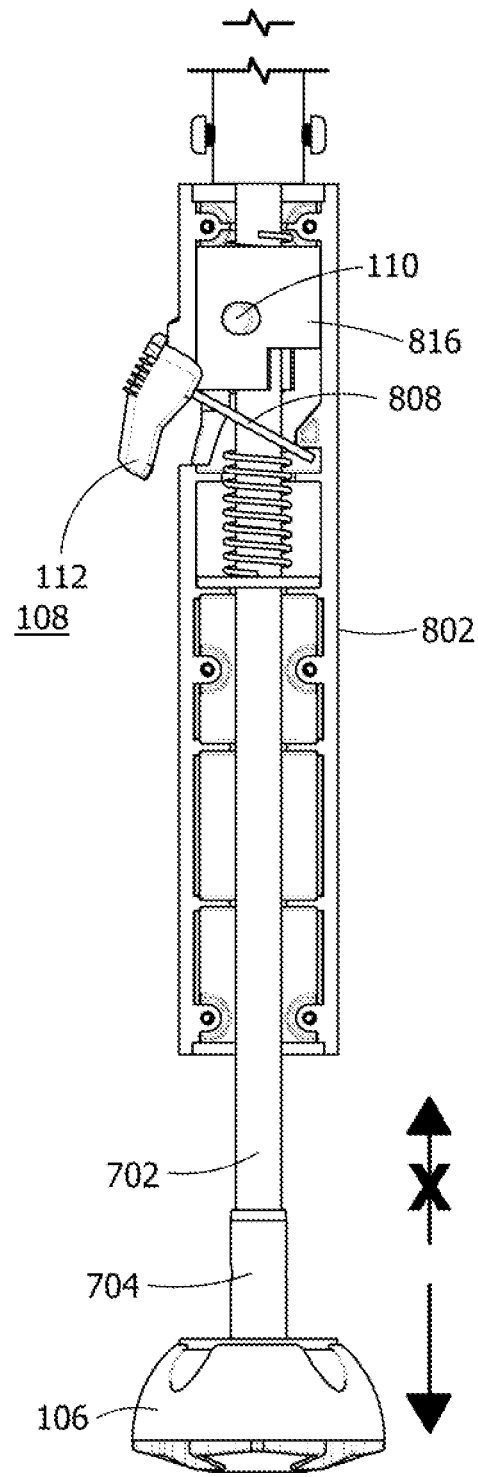
FIG. 14b is a left side internal view of the handle (removable cover installed, handle invisible) of the aquatic snare in a "lock on" position, showing restricted forward movement of the inner rod.
Figure 15A:
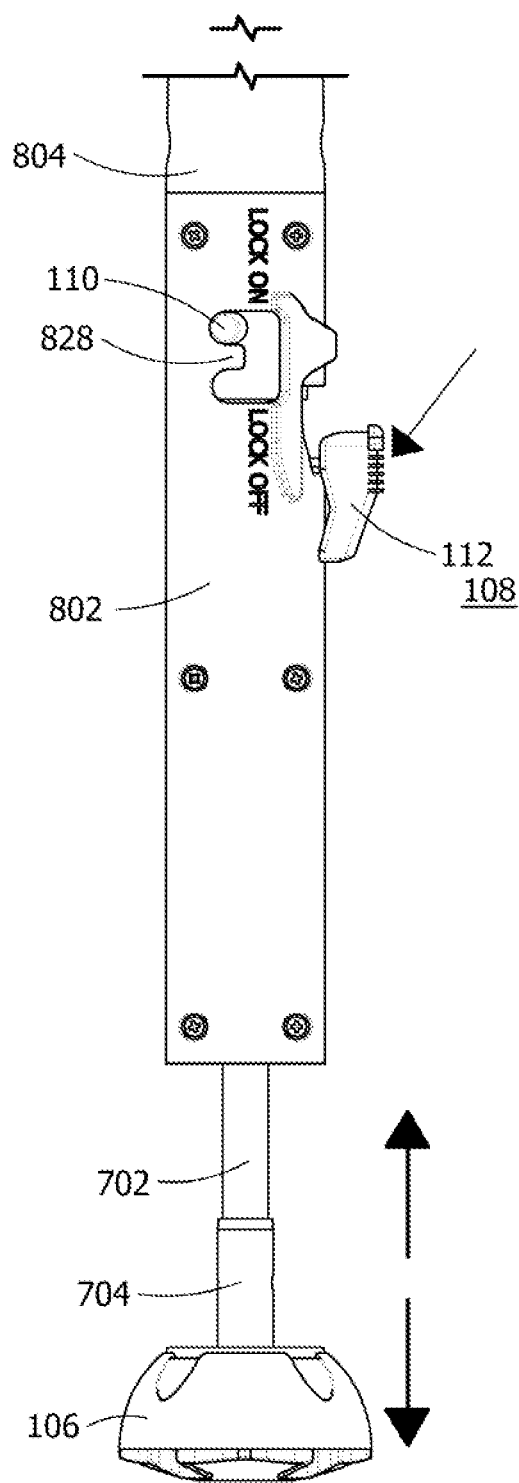
FIG. 15a is a right side view of the assembled handle (removable cover installed) of the aquatic snare in a "lock on" position with the depressor engaged, showing unrestricted movement of the inner rod.
Figure 15B:
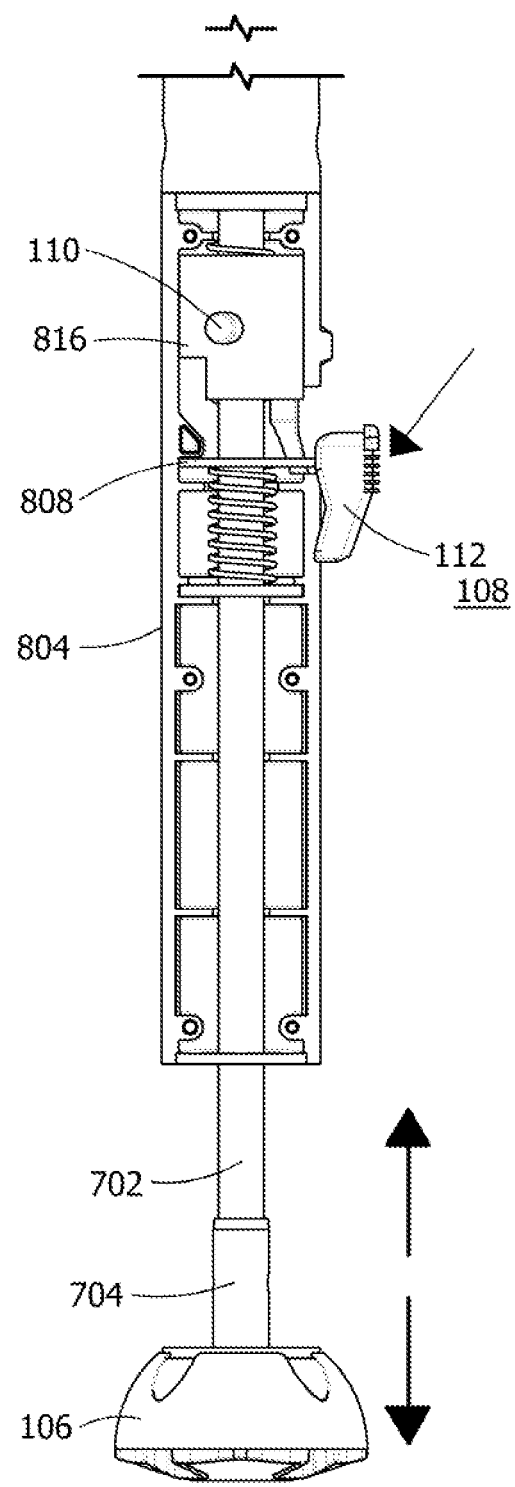
FIG. 15b is a right side view of the unassembled handle (removable cover removed) of the aquatic snare in a "lock on" position with the depressor engaged, showing unrestricted movement of the inner rod.
Figure 16A:
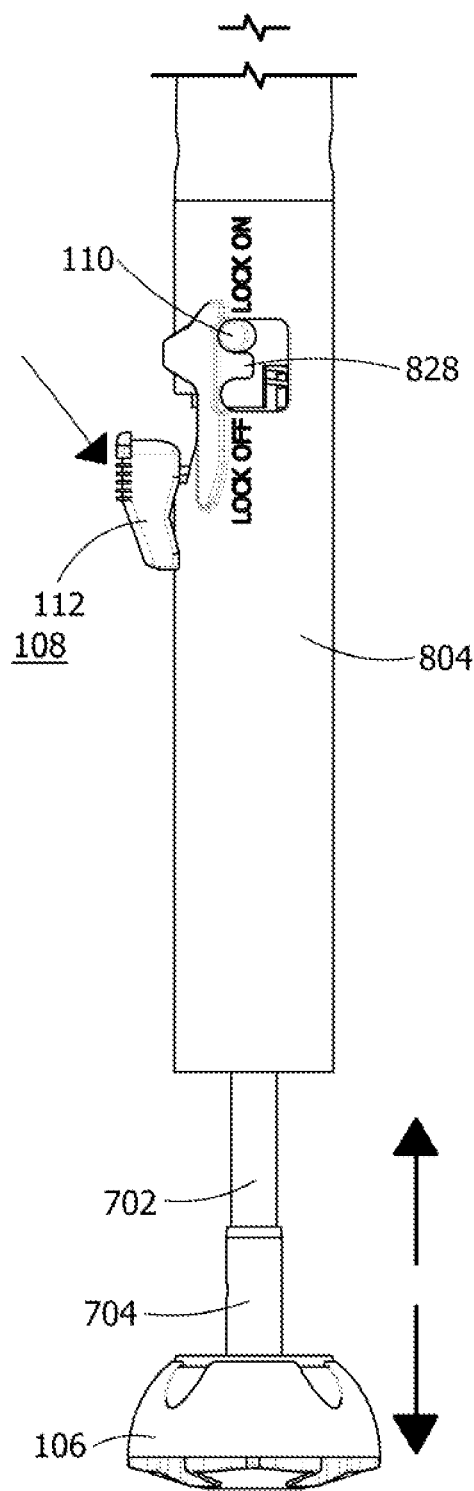
FIG. 16a is a left side view of the assembled handle (removable cover installed) of the aquatic snare in a "lock on" position with the depressor engaged, showing unrestricted movement of the inner rod.
Figure 16B:
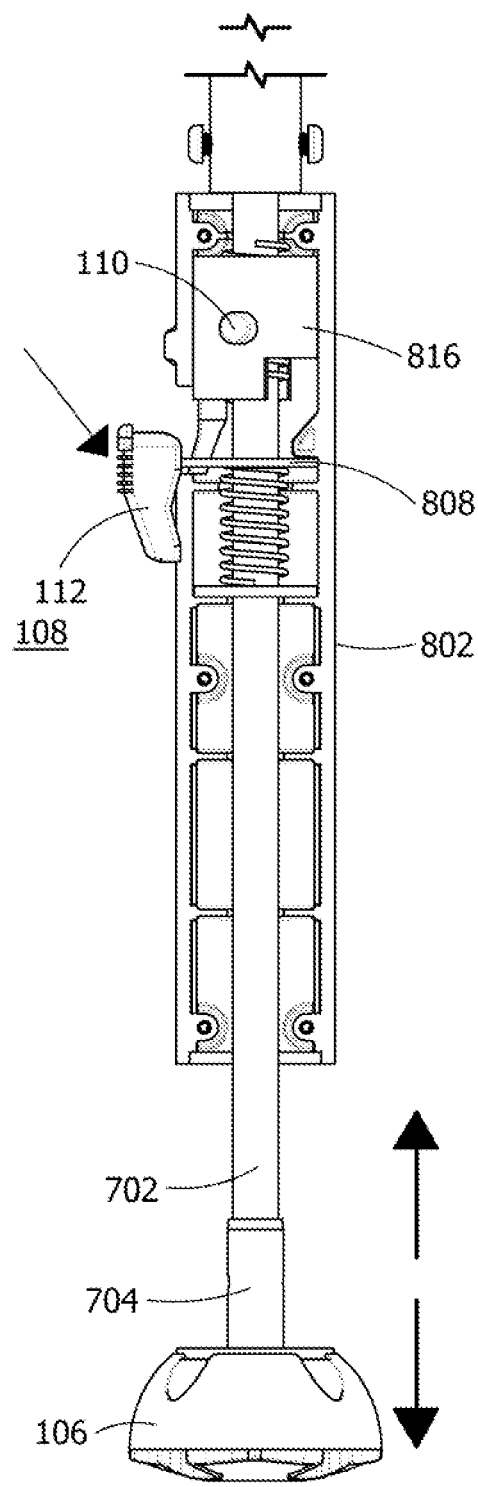
FIG. 16b is a left side internal view of the handle (removable cover installed, handle invisible) of the aquatic snare in a "lock on" position with the depressor engaged, showing unrestricted movement of the inner rod.

In the "lock on" position, inner rod 702 cannot move forward as tension plate 808, in an angular position shown in FIG. 12b, creates a friction lock with inner rod 702. The position of tension lock 808 and position of tab 810 creates a frictional contact between tension lock 808 and inner rod 702 that restricts the forward movement of inner rod 702. The only ways to release the frictional contact is for the user to press on depressor 112 or move the selector 110 to "lock off". The action of engaging depressor 112 provides unrestricted movement of inner rod 702, even in a "lock on" position. Engaging depressor 112 simulates aquatic snare 100 being in a "lock off" position, even when selector 110 is in the "lock on" position. This allows greater flexibility to the user as to when users want to restrict the forward movement of inner rod 702. In a "lock off" position, depressor 112 is in a vertical position and cannot be depressed.

For example, when snaring lobster 706, the user will pull back knob 106 and tighten lasso 104 on lobster 706. See FIGS. 7a and 7b. When the user secures lobster 706 on aquatic snare 100, the user does not want inner rod 702 to travel forward as it would allow lobster 706 to escape. Catching lobster 706 in the "lock on" position, allows the user to release lobster 706 when ready by pressing on depressor 112, even in the "lock on" position.

In the "lock off" position, inner rod 702 moves forward and backward freely (i.e., unrestricted). Tension plate 808, in a substantially vertical position relative to the axis of inner rod 702, shown in FIG. 11b, does not have a friction lock with inner rod 702. The position of tension lock 808 allows for unrestricted movement of inner rod 702.

As shown in FIGS. 8-10, aquatic snare 100 is spring loaded. Lower spring 812 creates a spring force between tension plate 808 and washer 824. Upper spring 814 creates a spring force between selector body 816 and the end of handle 804 where handle 804 meets outer rod 102.

In an exemplary embodiment of aquatic snare 100, a knob ring (not illustrated) is removably connected to knob 106. The knob ring allows the user to connect aquatic snare 100 to the user's dive belt or other garment to keep aquatic snare 100 connected to the user while underwater. If the user only holds aquatic snare 100 with his or her hand, there is a risk of losing aquatic snare 100 in the ocean. The knob ring also allows the user to store or hang aquatic snare 100 by the knob ring and not lasso 104. Historically, users of aquatic snares would hang the snare by the lasso or loop. Hanging a snare from the lasso deforms the lasso due to the weight of the snare hanging from the lasso. This can negatively impact the ability to route the lasso around lobster 706. Using a knob ring to hang aquatic snare keeps lasso 104 in its original shape.

As shown in FIGS. 7a, 7b, and 11-16 (a and b), the process of operating aquatic snare 100 includes positioning locking mechanism 108 to a locked position by moving selector 110 to a "lock on" position. The user places lasso 104 located at the proximal end of outer rod 102 over lobster 706 or other aquatic creature. Once ready, the user retracts or pulls knob 106 at the distal end of outer rod 102. Knob 106 is connected to the distal end of inner rod 702 either directly or through inner rod coupling 704. Inner rod 702 is located within the outer rod 102 and slidably engaged relative to outer rod 102. Lasso 104 is connected to the proximal end of inner rod 702.

The user tightens lasso 104 around lobster 706 by pulling knob 106 away from the distal end of outer rod 102. Inner rod 702 is restricted from forward movement, relative to outer rod 102, to prevent lasso 104 from expanding and letting lobster 706 scape. Inner rod 702 is in frictional contact with tension plate 808 when the aquatic snare 100 is in the locked position. The angled position of tension plate 808 prevents inner rod 702 from moving forward relative to outer rod 102.

In the locked position ("lock on"), inner rod 702 cannot move forward but can be retracted by pulling on knob 106. The only ways to move inner rod 702 to forward while in the "lock on" position, is to either press the depressor 112 or switch selector 110 to the "lock off" position in selector groove 806. When depressor 112 is pressed down in the "lock on" position, locking mechanism 108 is disengaged as tension plate 808 is no longer in frictional contact with inner rod 702. Pressing depressor 112 in the "lock on" positions mimics the restricted movement of inner rod 702 relative to the outer rod 102 that takes places in a "lock off" position, which allows unrestricted movement of the inner rod.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention

The invention claimed is:

1. An aquatic snare comprising:
an outer rod having a distal end and a proximal end;
an inner rod having a distal end and a proximal end;
the inner rod slidable within the outer rod;
a lasso connected to the proximal end of the inner rod;
a knob connected to the distal end of the inner rod;
the aquatic snare having a locking mechanism, comprising a depressor, selector, and a tension plate, wherein the locking mechanism is located on a handle at the distal end of the aquatic snare;
a selector groove in the handle guides the selector moveable to a locked or unlocked position, wherein:
the tension plate configured to restrict forward movement of the inner rod when the selector placed in the locked position; or
the tension plate configured to allow unrestricted movement of the inner rod when the selector is placed the unlocked position;
the selector groove is on two sides of the handle, a first side and a second side; and
the orientation of the selector groove on the first side is inverted relative to the second side.

2. The aquatic snare of claim 1, wherein the locking mechanism is spring loaded.

3. The aquatic snare of claim 1, wherein the knob is independently rotatable.

4. The aquatic snare of claim 1, wherein the handle includes a removable cover.

5. The aquatic snare of claim 1, further comprising a removable ring connected to the knob.

6. The aquatic snare of claim 1, wherein the lasso has two ends secured to the inner rod.

\* \* \* \* \*